United States Patent
Meissner et al.

(10) Patent No.: US 6,896,983 B2
(45) Date of Patent: May 24, 2005

(54) MEMBRANE FOR FUEL CELLS

(75) Inventors: Dieter Meissner, Linz (AT); Klaus Kohrs, Schweinitz (DE)

(73) Assignee: Forschungszentrum Julich GmbH, Julich (DE)

( * ) Notice: Subject to any disclaimer, the term of this patent is extended or adjusted under 35 U.S.C. 154(b) by 274 days.

(21) Appl. No.: 10/204,198

(22) PCT Filed: Feb. 16, 2001

(86) PCT No.: PCT/DE01/00619

§ 371 (c)(1), (2), (4) Date: Aug. 16, 2002

(87) PCT Pub. No.: WO01/60895

PCT Pub. Date: Aug. 23, 2001

(65) Prior Publication Data

US 2003/0022049 A1 Jan. 30, 2003

(30) Foreign Application Priority Data

Feb. 19, 2000 (DE) .......................... 100 07 654

(51) Int. Cl.$^7$ ............................ H01M 8/02; H01M 8/10
(52) U.S. Cl. ............................ 429/13; 429/33; 429/46
(58) Field of Search ............................ 429/13, 33, 46

(56) References Cited

U.S. PATENT DOCUMENTS

| | | | | |
|---|---|---|---|---|
| 3,479,267 A | | 11/1969 | Krishnaswamy | |
| 4,592,973 A | * | 6/1986 | Pemsler et al. | 429/206 |
| 4,801,359 A | * | 1/1989 | Jeanne et al. | 205/354 |
| 5,531,871 A | * | 7/1996 | Fauteux et al. | 205/688 |
| 5,928,488 A | | 7/1999 | Newman | |
| 6,242,122 B1 | | 6/2001 | Dohle et al. | |
| 2003/0035991 A1 | * | 2/2003 | Colombo et al. | 429/33 |

FOREIGN PATENT DOCUMENTS

| | | |
|---|---|---|
| DE | 3431943 | 3/1985 |
| DE | 19646487 | 5/1998 |
| FR | 2583066 | 12/1986 |

OTHER PUBLICATIONS

H. Engelkamp et al. "Self–Assembly of Disk–Shaped Molecules to Coiled–Coil Aggregates with Tunable Helicity", Science, vol. 284, Apr. 30, 1999, pp. 785–788.*

Thomas A. Davis, J. David Genders and Derek Pletcher, "A First Course in Ion Permeable Membranes", pp. 18–21, The Electrochemical Consultancy, Hampshire, England.

* cited by examiner

Primary Examiner—Gregg Cantelmo
(74) Attorney, Agent, or Firm—Frishauf, Holtz, Goodman & Chick, P.C.

(57) ABSTRACT

The invention relates to a membrane, in particular, a membrane for use in a methanol fuel cell. The inventive membrane comprises complexing agents for cations and, therefore, functions like an anion exchanger. In a particular embodiment, the membrane comprises complexing agents selected from the group of crown ethers, cryptates, or of cryptate-like compounds based on carbon cyclic compounds or silicon compounds.

14 Claims, No Drawings

MEMBRANE FOR FUEL CELLS

CROSS REFERENCE TO RELATED APPLICATION

This application is a U.S. National Phase Application under 35 USC 371 of International Application PCT/DE01/00619 filed Feb. 16, 2001.

BACKGROUND OF THE INVENTION

1. Field of the Invention

The invention relates to a membrane, especially a membrane for use in a fuel cell, as well as to a fuel cell containing such a membrane.

2. Background Information

A fuel cell comprises a cathode, an anode and an electrolyte disposed between the anode and cathode. An anode chamber adjoins the anode and a cathode chamber adjoins the cathode.

In a methanol fuel cell, methanol is fed as working gas to the anode chamber. On the cathode side, oxygen or air is supplied as oxidizing agent. By means of a catalyst, hydrogen ions are formed from the methanol at the anode. The hydrogen ions pass through the electrolyte, which typically comprises a membrane, and on the cathode side combine with the oxygen ions formed from the oxidizing agent to produce water. In the process, electrons are liberated and electrical energy is generated.

From German Patent 196 46 487 C2 it follows that the electrolytes of known fuel cells allow not only the hydrogen ions (protons) to pass, water in the form of hydrate shells around the protons and even some of the fuel ($CH_3OH$) can also pass. This means on the one hand that too much water is transported from the anode to the cathode, thus adversely affecting the thermal balance, while on the other hand methanol is also additionally transported, thus leading in general to development of a mixed potential at the cathode and thus to a perceptible loss of efficiency.

SUMMARY OF THE INVENTION

An electrolyte used typically in the direct methanol fuel cell (DMFC) is the cation-exchange membrane Nafion®. With this membrane also, the proton transport from anode to cathode is again accompanied by migration of methanol and water through the membrane. This results in potential changes on the cathode side and in destruction of the catalyst. Furthermore, the methanol loss causes reduction of the efficiency of the fuel cell.

One alternative would be to use a separating layer of anion-exchange material. In this way the problem of methanol transport through the membrane could be greatly reduced in principle, albeit at the cost of higher ohmic resistance and higher material costs. Heretofore no suitable materials have been found for this purpose.

In conventional anion-exchange materials, the substituted group is typically an —$NR_3^+$ group (quaternary nitrogen group with R=—H or -alkyl). It is known that this group itself is not very stable, and so the stability and physical properties of such anion-exchange materials can be maintained for only a short time compared with corresponding cation-exchange materials. This is particularly true in the presence of strong bases and higher temperatures, as follows from "Ion Permeable Membranes", by T. A. Davis, J. D. Genders and D. Pletcher, Alresford Press Ltd., 1997, p. 20.

The object of the invention is to provide a thermally stable membrane that does not suffer from the foregoing disadvantages. Another object of the invention is to provide a fuel cell in which the destruction of the cathode by methanol as well as the change of potential at the electrodes is largely prevented.

The object is achieved by a membrane containing a cation-complexing agent; and by a fuel cell including an anode, a cathode and a membrane disposed between the anode and cathode, wherein the membrane contains a cation-complexing agent.

DETAILED DESCRIPTION OF THE INVENTION

The inventive membrane contains cation-complexing agents. For example, a typical membrane of this type could comprise individual polymer chains,whose side chains contain the complexing agents. Such a membrane can be synthesized, for example, by linking crown ethers via phthalocyanine units, as described hereinafter. Benzo-18-crown-6 is brominated in the 4,5 positions and reacted with a cyanide to obtain the substituted phthalodinitrile. This step is followed by a phthalocyanine synthesis.

A further example of an inventive membrane is obtained by the aforesaid synthesis scheme by using dibenzo-18-crown-6 instead of benzo-18-crown-6.

The inventive membrane permits orderly ionic transport of anions, especially $O^{2-}$ ions or hydroxyl ions through the membrane, but advantageously prevents cation transport, and especially the transport of larger molecules such as methanol.

Furthermore, the inventive membrane is thermally stable and insensitive to bases. It is advantageously suitable for use in a fuel cell, especially a methanol fuel cell, since the way in which it functions is not impaired by the temperatures and ambient conditions prevailing therein.

An advantageous embodiment of the inventive membrane contains as the cation-complexing agent at least one component from the group of cryptands or cryptate-like compounds. The cyclic compounds on which these groups are based have a carbon or silicon skeleton.

By cryptand there is understood a macropolycyclic azapolyether, in which two bridgehead nitrogen atoms are joined by bridges containing one or more O atoms. By virtue of their three-dimensional structure, the cryptands are capable of forming extremely stable complexes known as cryptates with metal ions, especially alkali and alkaline earth ions.

Within the meaning of the invention, cryptand-like compounds are to be understood as compounds whose structure is analogous to that of the crown ethers but which are based on a silicon skeleton.

Further suitable components for a complexing agent of the inventive membrane are the crown ethers, which are defined as planar macrocyclic polyethers, whose oxygen atoms are joined in particular by ethylene bridges. In many cases benzene or cyclohexane rings are also attached by condensation. Simple monocyclic crown ethers can be readily synthesized by reacting suitable polyethylene glycols with corresponding dichlorides in alkaline tetrahydrofuran solution.

Crown ethers have the property of forming coordination compounds very readily with metal ions, especially alkali and alkaline earth ions, and thus of transporting ions. The stability of the resulting crown compounds is directly related to how well the cations fit into the ligand cavity. Cryptands and the cryptate-like compounds have analogous properties.

By virtue of the cation-complexing agents that it contains, the inventive membrane is capable, for example, of binding cations and thus permitting the transport of anions, especially hydroxyl ions.

The inventive fuel cell comprises an anode, a cathode and an inventive membrane disposed between the anode and cathode. The membrane is particularly for conducting anions. The membrane contains cation-complexing agents. The use of such a membrane permits ionic transport of anions such as $O^{2-}$ ions or hydroxyl ions through the membrane, but prevents the transport of cations such as protons.

Complexing agents are compounds that are capable of forming complexes with metal ions, especially with alkali and alkaline earth ions. Examples of advantageous cation-complexing agents that are capable of binding cations in complexes include crown ethers, cryptands or cryptate-like compounds, as claimed in claim 5 relating to the membrane of a fuel cell.

In the inventive method for operation of a fuel cell, methanol is oxidized in an anodic reaction and oxygen is reduced in a cathodic reaction. Penetration of methanol into the cathode chamber is prevented by the inventive membrane. In the inventive method, only the oxide ions formed at the cathode or else hydroxyl ions migrate in an orderly fashion through the membrane to the anode, recombining with the fuel in the anode chamber to produce water.

What is claimed is:

1. A fuel cell comprising an anode, a cathode and a membrane disposed between the anode and the cathode, wherein the membrane contains a cation-complexing agent, which is a linked crown ethers, the linked known ether being selected from the group consisting of benzo-18-crown-6 linked via phthalocyanine units and dibenzo-18-crown-6 linked via phthalocyanine units.

2. The fuel cell according to claim 1, wherein the linked crown ether is benzo-18-crown-6 which is linked via phthalocyanine units.

3. The fuel cell according to claim 1, wherein the linked crown ether is dibenzo-18-crown-6 which is linked via phthalocyanine units.

4. The fuel cell according to claim 1, wherein the membrane is synthesized by brominating a crown ether selected from the group consisting of benzo-18-crown-6 and dibenzo-18-crown-6 in the 4,5 positions, carrying out a reaction with a cyanide to obtain a substituted phthalodinitrile and carrying out a phthalocyanine synthesis, whereby the crown ether is cross-linked via phthalocyanine units to form the membrane.

5. A fuel cell comprising an anode, a cathode and a membrane disposed between anode and cathode, wherein the membrane contains at least one component selected from the group consisting of a cryptate and a cryptate-like compound based on a carbon compound or a silicon cyclic compound.

6. A method for operating a fuel cell containing a cathode and an anode, in which methanol is oxidized in an anodic reaction and oxygen is reduced in a cathodic reaction, comprising passing anions from the cathode through a membrane and to the anode, the membrane containing a cation-complexing agent, and preventing penetration of methanol into a cathode chamber of the fuel cell.

7. The method according to claim 6, wherein the cation-complexing agent comprises at least one component selected from the group consisting of a cryptate and a cryptate-like compound based on a carbon compound or a silicon cyclic compound.

8. The method according to claim 6, wherein the cation-complexing agent comprises a crown ether.

9. The method according to claim 8, wherein the crown ether is a linked crown ether.

10. The method according to claim 9, wherein the linked crown ether is benzo-18-crown-6 which is linked via phthalocyanine units.

11. The method according to claim 9, wherein the linked crown ether is dibenzo-18-crown-6 which is linked via phthalocyanine units.

12. In a fuel cell comprising an anode, a cathode, and a membrane disposed between the anode and the cathode, wherein the fuel cell is a methanol fuel cell, and the membrane contains a cation-complexing agent which is a linked crown ether, wherein the linked crown ether is selected from the group consisting of benzo-18-crown-6 linked via phthalocyanine units and dibenzo-18-crown-6 linked via phthalocyanine units.

13. In a fuel cell comprising an anode, a cathode and a membrane disposed between the anode and the cathode, wherein the fuel cell is a methanol fuel cell, and the membrane contains at least one component selected from the group consisting of a cryptate and a cryptate-like compound based on a carbon compound or a silicon cyclic compound.

14. A fuel cell comprising an anode, a cathode and a membrane disposed between the anode and the cathode, wherein the membrane contains a cation-complexing agent, which is a linked crown ether, and wherein the crown ether is a monocyclic crown ether which is synthesized by reacting polyethylene glycol with a dichloride in an alkaline tetrahydrofuran solution.

* * * * *